United States Patent
Kumar et al.

(10) Patent No.: US 6,939,587 B1
(45) Date of Patent: Sep. 6, 2005

(54) FABRICATION OF ALIGNED CRYSTAL CELL/FILM BY SIMULTANEOUS ALIGNMENT AND PHASE SEPARATION

(75) Inventors: Satyendra Kumar, Kent, OH (US); Liang-Chy Chien, Stow, OH (US); Jae-Hoon Kim, Chunchon Kanwon-Do (KR)

(73) Assignee: Kent State University, Kent, OH (US)

( * ) Notice: Subject to any disclaimer, the term of this patent is extended or adjusted under 35 U.S.C. 154(b) by 72 days.

(21) Appl. No.: 10/070,396

(22) PCT Filed: Sep. 1, 2000
(Under 37 CFR 1.47)

(86) PCT No.: PCT/US00/24025

§ 371 (c)(1),
(2), (4) Date: Jul. 3, 2002

(87) PCT Pub. No.: WO01/18594

PCT Pub. Date: Mar. 15, 2001

Related U.S. Application Data

(60) Provisional application No. 60/152,430, filed on Sep. 3, 1999.

(51) Int. Cl.$^7$ .............................. C08J 7/06; C08J 7/18; C08F 2/50; B05D 3/06; G02F 1/1337
(52) U.S. Cl. .................. 427/510; 427/517; 427/553; 349/124; 349/125; 349/168
(58) Field of Search .................... 427/508, 510, 427/512, 517, 553, 554, 555, 162, 163.1, 427/164, 165, 168, 169; 349/123, 124, 125, 349/128, 129, 138, 162, 163, 168, 182, 183

(56) References Cited

U.S. PATENT DOCUMENTS

| | | | |
|---|---|---|---|
| 5,530,566 A | * | 6/1996 | Kumar .................. 349/86 |
| 5,602,661 A | | 2/1997 | Schadt et al. ............ 349/124 |
| 5,604,615 A | | 2/1997 | Iwagoe et al. ........... 349/124 |
| 5,623,354 A | | 4/1997 | Lien et al. ............... 349/124 |
| 5,729,319 A | * | 3/1998 | Inou et al. ............... 349/156 |

(Continued)

FOREIGN PATENT DOCUMENTS

| EP | 0 568 355 A2 | 11/1993 | ......... G02F 1/1339 |
|---|---|---|---|
| JP | 08179286 | 7/1996 | ......... G02F 1/1333 |
| JP | 11153787 | 6/1999 | ......... G02F 1/1333 |
| JP | 11237612 | 8/1999 | ......... G02F 1/1333 |
| JP | 2000-147476 | * 5/2000 | |

OTHER PUBLICATIONS

S. Kobayashi et al., "New Development in Alignment Layers for Active Matrix TN-LCDs", *IDRC*, (Oct. 11, 1994), pp. 78-85.

(Continued)

*Primary Examiner*—Marianne Padgett
(74) *Attorney, Agent, or Firm*—Fay, Sharpe, Fagan, Minnich & McKee, LLP

(57) ABSTRACT

A method for simultaneously fabricating a phase separated organic film and microstructures with liquid crystal having desired alignment is disclosed. The method includes the step of preparing a mixture of liquid crystal material, prepolymer, and polarization-sensitive material. The mixture is disposed on a substrate and a combination of UV or visible light or heat treatment is applied while simultaneously inducing phase separation so as to form a layer or microstructure of appropriately aligned liquid crystal material adjacent the substrate.

20 Claims, 2 Drawing Sheets

U.S. PATENT DOCUMENTS

| | | | |
|---|---|---|---|
| 5,756,649 A | | 5/1998 | Mizushima et al. ......... 528/353 |
| 5,769,393 A | * | 6/1998 | Kobayashi et al. .... 252/299.01 |
| 5,786,041 A | | 7/1998 | Takenaka et al. ............... 428/1 |
| 5,936,691 A | | 8/1999 | Kumar et al. ............... 349/124 |
| 5,949,508 A | | 9/1999 | Kumar et al. ............... 349/122 |
| 6,083,575 A | | 7/2000 | Ninomiya et al. ........... 428/1.1 |
| 6,160,597 A | * | 12/2000 | Schadt et al. .................. 349/98 |
| 6,203,866 B1 | * | 3/2001 | Mochizuki et al. ........... 428/1.1 |
| 6,610,462 B1 | * | 8/2003 | Chien et al. ................. 430/321 |
| 2002/0196390 A1 | * | 12/2002 | Penterman et al. ............ 349/73 |
| 2003/0032713 A1 | * | 2/2003 | Penterman et al. ......... 524/500 |
| 2004/0125451 A1 | * | 7/2004 | Miyatake .................... 359/494 |

OTHER PUBLICATIONS

M. Schadt et al., "Photo-Induced Alignment and Patterning of Hybrid Liquid Crystalline Polymer Films on Single Substrates", *Japanese Journal of Applied Physics*, vol. 34 (Jun. 1995), pp. L764-L767 Part 2, No. 6B.

V.G. Nazarenko et al., "Oriented Dispersion of Liquid Crystal Droplets in a Polymer Matrix with Light Induced Anisotropy", *Mol. Mat.* (1993), vol. 2, pp. 295-299, no month.

L. Corvazier et al., "Induction of Liquid Crystal Orientation through Azobenzene-Containing Polymer Networks", *Macromolecules* (1999), vol. 32, No. 10, pp. 3195-3200, no month.

S. C, Jain et al., "A Technique to Align Liquid Crystals Based on Bulk-Induced Photo-Polymerization", *Mol. Cryst. Liq. Cryst.*, (1996), vol. 288, pp. 153-160, no month.

E. Shimada, "Control of Polymer Orientation in Polymer Dispersed Liquid Crystal (PDLC)", *Japanese Journal of Applied Physics*, Part 2, 31(Mar. 15, 1992) No. 3b, pp. L352-L354, no month.

R. Penterman et al., "Single-Substrate Liquid-Crystal Displays by Photo-Enforced Stratification", *Nature*, vol. 417, (May 2, 2002), pp. 55-58.

* cited by examiner

FABRICATION OF ALIGNED CRYSTAL CELL/FILM BY SIMULTANEOUS ALIGNMENT AND PHASE SEPARATION

This application claims the benefit of provisional application No. 60/152,430 filed Sep. 3, 1999.

TECHNICAL FIELD

The present invention resides in the art of light modulating devices made with composite organic materials utilizing self-aligned layers. Specifically, the invention combines two processes, in-situ photoalignment using polarized ultraviolet (UV) light exposure and anisotropic phase separation using phase-separated composite organic film (PSCOF) technology using a one- or multi-step process to prepare aligned liquid crystal films adjacent a polymer layer with or without pre-tilt. In particular, this method permits preparation of aligned liquid crystal cells, without the need for two pre-fabricated alignment layers, one on each substrate.

BACKGROUND ART

The PSCOF method was recently invented and used at Kent State University to prepare adjacent parallel layers of polymer and liquid crystal. This method is disclosed in U.S. Pat. No. 5,949,508, and is incorporated herein by reference. The PSCOF method involves a process similar to that used in the fabrication of polymer dispersed liquid crystal films. The polymer and liquid crystals are mixed in a predetermined proportion and placed between two substrates with well defined thickness or over one substrate. When a beam of UV light is made incident from one side, the phase separation process is initiated. The rate of polymerization (and phase separation) is faster near the source of UV radiation due to higher intensity. As the phase separation starts, the organic or liquid crystal material is expelled from the polymerizing portion and begins to migrate away from the source of UV radiation. As a result, a uniform film of polymer is obtained on one side of the cell, and a substantially uniform layer of liquid crystal is formed on the opposite side of the cell away from the UV light source. The separation of liquid crystal from polymer can be aided by a pre-disposed alignment layer which the liquid crystal material likes to wet, on the substrate away from the UV source. As such, an aligned liquid crystal film may be formed.

The alignment layer is typically made up of a long chain polymeric material which is traditionally later subjected to processes such as mechanical rubbing or ultraviolet exposure to alter the surface properties. There are several generally accepted techniques for forming an alignment layer on the substrate of a liquid crystal device. Commonly used methods are rubbing or photo-alignment of organic/polymer films, and evaporation of inorganic materials. Although each method is capable of aligning the liquid crystal material, each method has particular drawbacks.

The most commercially used method of forming an alignment layer is the rubbing technique. In this method, for example, a polyamic acid is spin-coated or otherwise deposited on a substrate. The polyamic acid is subjected to two heat treatments, soft-bake and hard-bake, to form a polyimide (PI) film. After an appropriate cooling period, the PI film is rubbed by a cloth, such as velvet, in a uniform singular direction. When the liquid crystal later comes in contact with the rubbed surface, the liquid crystal aligns along the rubbing direction. Unfortunately, this method can cause mechanical damage and generate electrostatic charges, both of which adversely affect liquid crystal displays, especially those that employ thin-film transistors. The rubbing method also generates dust from the cloth and PI, which may contaminate the liquid crystal material.

Another method of forming an alignment layer involves forming a PI film on a substrate, as described above. A linearly polarized ultraviolet light is projected onto the surface of the PI film to produce the desired molecular alignment. The UV radiation anisotropically photodissociates photosensitive bonds in the PI, including those in the imide ring. This selectively reduces the polarizability of PI molecules and changes the surface properties and morphology. Unfortunately, this method results in alignment layers with weak anchoring of liquid crystals and poor thermal and chemical stability. Furthermore, this method requires costly multi-step processing. Yet another drawback of this method is that it only provides a limited charge holding ratio and less thermal stability when compared to the rubbing technique.

A similar method of preparing an alignment layer by using photo-sensitive polymers is also known. For example, photo-sensitive polymers such as poly(vinyl)4-methoxycinnamate (PVMC); poly(vinyl)cinnamate (PVC); and polysiloxanecinnamate films may be used to align liquid crystal material. These materials, when exposed to a linearly polarized ultraviolet light (LPUV), initiate a photo-reaction after evaporation of the solvent. This method causes cross-linking (bonding) and resultant orientation of the side chain molecules uniaxially in a direction determined by the direction of linear polarization. However, this process does not chemically fix the orientation of the molecules and the alignment is lost upon exposure to normally occurring un-polarized UV light. Moreover, the chemical composition of the materials is lost over time. Consequently, the alignment layer thus produced does not provide a fixed, stable orientation of liquid crystal material.

Yet another method for forming an alignment layer on a substrate is deposition by evaporation of inorganic materials onto the surface of the substrate at various incidence angles. This forms an alignment layer which physically orients the director of the liquid crystal. Inorganic materials which have been used include silicon oxides and magnesium oxides. This deposition method has proven to be cumbersome and difficult to use in a manufacturing process.

Another process for forming alignment layers, developed by Kent State University, is the in-situ UV exposure method. This method is disclosed in U.S. Pat. No. 5,936,691, and is incorporated herein by reference. The in-situ method is similar to the conventional process of exposing PI film to polarized UV light. The in-situ method, however, exposes the polyimide film (PI) to UV radiation while the film is being soft- and hard-baked. The resulting alignment layers have higher anchoring energies and are thermally more stable compared to the conventional UV exposure technique. For example, cells prepared with the conventional method lose alignment when maintained at 100° C. for 12 hours, while cells prepared by the in-situ method, show no sign of deterioration at 300° C. for 12 hours. The in-situ method of forming an alignment layer avoids many of the drawbacks of other methods known in the art, while requiring fewer and simpler processing steps.

Although the in-situ method has been shown to be effective, it still requires that the alignment film must still be properly disposed and processed. Moreover, for all the alignment methods discussed above, the alignment layer may be damaged if care is not taken in transferring the substrate between the manufacturing stations. It is also theorized that currently known alignment layers only directly affect the liquid crystal material adjacent thereto.

It has also been disclosed in U.S. Pat. No. 6,083,575 that a polymer dispersion type liquid crystal (PDLC) element may be manufactured by applying laser interference light to a polymerizable composition containing a polymerizable compound having a photo-dimerizable structure and low molecular weight liquid crystals. The laser interference light causes polymer phase separation. Polarized light is then applied to orient the low molecular liquid crystal. As stated in that patent, a polymer dispersion type liquid crystal is a display element in which liquid crystals are dispersed in the interstices of polymers of a three dimensional structure. However, while U.S. Pat. No. 6,083,575 teaches the use of a photo-sensitive polymer, the teachings of this patent are limited to polymer dispersion type liquid crystal cells. Various limitations are inherent in PDLC cells however, compared to cells using phase separated composite organic films for example. PDLC cells have higher voltage requirements, slower switching speeds and very low multiplexability. Phase separated composite organic films also allow for the formation and use of more-well defined geometries in liquid crystal displays, especially in bulk form. No teaching or suggestion is made regarding the construction of a liquid crystal element of a type other than a polymer dispersion type liquid crystal, such as a phase-separated composite organic film as present in the present application or the use of photo-sensitive polymers to create an alignment film.

In light of the foregoing, it is evident that there is a need in the art for a light modulating device comprising a phase separated composite organic film, and a method for manufacturing such a film, that is homogeneously aligned during formation, thus obviating the need for the preparation and processing of a separate and distinct alignment layer.

DISCLOSURE OF INVENTION

In light of the foregoing, it is a first aspect of the present invention to provide a light modulating device comprising a phase separated composite organic film or micro-structures and a method for manufacturing such a device, wherein the device homogeneously aligns the liquid crystal material without the need for two separate alignment layers.

Another aspect of the present invention is to provide a self-aligned phase separated composite organic film made by using a one- or multi-step method of simultaneous phase separation and photoalignment.

Yet another aspect of the present invention is to provide an anisotropic film or micro-structures made by a process of simultaneous photoalignment and photopolymerization.

Still another aspect of the present invention is to provide an anisotropic film or micro-structures made by a process of simultaneous photoalignment and solvent induced phase separation, wherein the liquid crystal alignment is obtained at all internal polymer interfaces (walls) of the microstructure.

A further aspect of the present invention is to provide a film or micro-structures made by a process of simultaneous photoalignment and thermally-induced polymerization.

Yet a further aspect of the present invention is to provide an anisotropic film or micro-structures comprising two or more layers, prepared by using a multi-step method wherein the liquid crystal material layer is aligned separately at each surface of the film and may have a different orientation.

Other aspects of the invention are achieved by a method for fabricating an anisotropic film, including the steps of spin-coating a photo-crosslinkable polyimide onto a substrate, spin-coating a reactive liquid crystalline monomer onto the polyimide, and applying polarized light to simultaneously crosslink the polyamic acid and photoalign and polymerize the reactive monomer. The UV light causes a proper morphology at the polyimide/liquid crystal interface which, in turn, orients the liquid crystal material.

Further aspects of the invention are achieved by a method for fabricating an anisotropic film, including the steps of spin-coating a liquid crystal polymer (LCP) onto a substrate, spin-coating a reactive monomer onto the LCP, and applying polarized light to simultaneously photoalign the LCP and photoalign and polymerize the reactive monomer.

Yet other aspects of the invention are achieved by a method for fabricating an anisotropic film, including the steps of preparing a mixture of a liquid crystal material, a polymer, and a solvent, disposing the mixture onto a substrate, evaporating the solvent, and applying polarized light to simultaneously photoalign and phase separate the liquid crystal material.

Still further aspects of the invention are achieved by a method for fabricating an anisotropic film, including the steps of preparing a mixture of a liquid crystal material and a thermally polymerizable monomer, disposing the mixture onto a substrate, and subjecting it to a thermal treatment to polymerize the monomer, and polarized light to photoalign the liquid crystal material.

Additional aspects of the invention are achieved by a method for fabricating an anisotropic film and/or microstructures comprising of two or more layers or microstructures, the method including the steps of sequentially performing two or more of the above methods, thereby preparing multiple layers of aligned material, wherein liquid crystal is individually and uniquely aligned at each interface/surface.

The foregoing and other objects of the present invention, which shall become apparent as the detailed description proceeds, are achieved by a method for fabricating simultaneously a phase separated organic film with alignment, including preparing a mixture of liquid crystal, prepolymer and a polarization-sensitive material, disposing the mixture on a substrate, and applying a polarized light from a light source and inducing simultaneous phase separation of the mixture and alignment of the phase separated liquid crystal so as to form a layer of homogeneously aligned liquid crystal material adjacent a layer of polymer and the polarization-sensitive material on the substrate.

Other aspects of the present invention are attained by a method for fabricating a liquid crystal device with alignment properties including providing a substrate, providing a first mixture comprising at least a first polarization-sensitive agent, and a prepolymer, providing a second mixture comprising at least a second polarization-sensitive agent and a prepolymer, mixing into either the first or second mixture a liquid crystal, disposing the first mixture on to the substrate, disposing the second mixture over the first mixture, initiating a process to the first mixture from the group consisting of at least visible light polarization, ultraviolet light polarization, thermal induction, chemical induction, and solvent induction, initiating a process to the second mixture from the group consisting of at least visible light polarization, ultraviolet light polarization, thermal induction, chemical induction, and solvent induction, and the processes imparting orientational alignments to the liquid crystal.

Still another object of the present invention is attained by a cell having alignment properties, including at least one substrate and a mixture disposed on the substrate, the mixture comprising at least a liquid crystal material, a prepolymer material and a polarization-sensitive material, wherein simultaneous polymerization and application of polarized light causes phase separation and photo-alignment of the mixture, thus forming a microstructure of polymer that imparts alignment properties to the liquid crystal material.

These and other objects of the present invention, as well as the advantages thereof over existing prior art forms, which will become apparent from the description to follow, are accomplished by the improvements hereinafter described and claimed.

BRIEF DESCRIPTION OF THE DRAWINGS

For a complete understanding of the objects, techniques and structure of the invention, reference should be made to the following detailed description and accompanying drawings wherein.

BEST MODE FOR CARRYING OUT THE INVENTION

Figure 1:
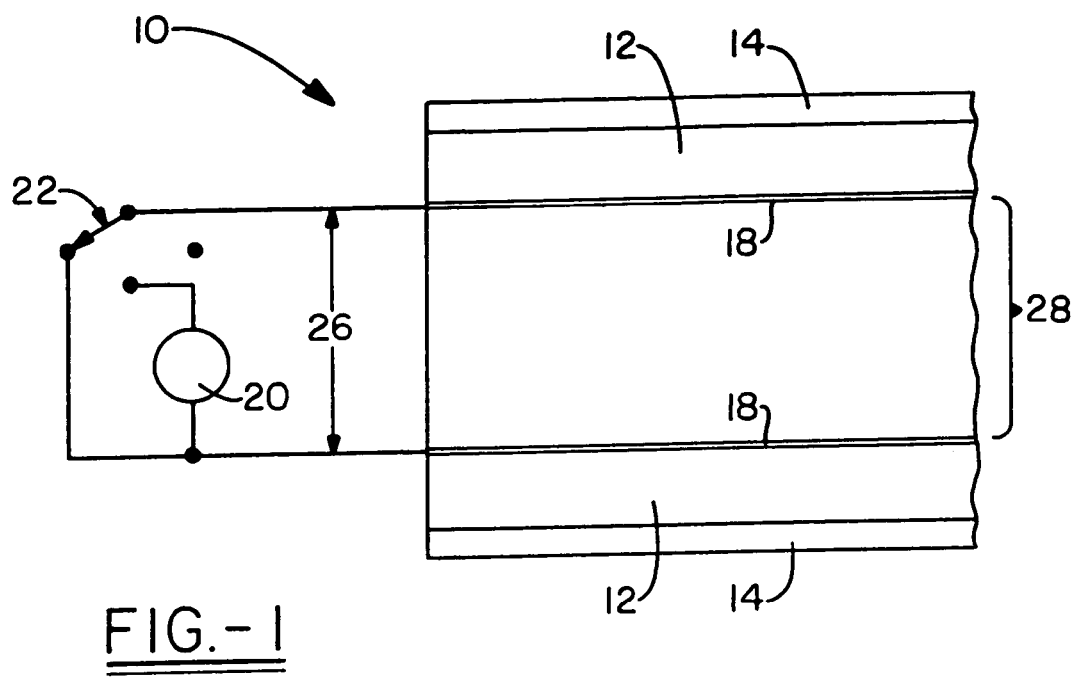
FIG. 1 is an enlarged, partial cross-sectional, schematic view of a precursor to the light modulating device according to the present invention, prior to polymerization and alignment.

Referring now to FIG. 1, it can be seen that a precursor to the light modulating device, made according to the present invention, is designated generally by the numeral 10. As will become apparent, the light modulating cell precursor 10 does not include—although one may be provided—a separate, distinct alignment layer. The light modulating device of the present invention may be manufactured by a method which does not require a separate spin-coating step to deposit alignment layer precursor material onto the substrate. The method also does not require soft baking and/or hard baking the alignment layer. Further, the method does not require rubbing or otherwise physically contacting the alignment layer to impart properties that will later affect the liquid crystal material.

The light modulating device precursor, shown in FIG. 1, includes a pair of opposed, optically clear substrates 12 which may be glass, plastic or other material commonly known in the art. Advantageously, the device does not need to withstand the temperatures necessary to imidize the alignment layers of the prior art. As will become apparent, temperature-sensitive materials heretofore not suitable as substrates can be utilized in the present invention. In other words, flexible substrate materials such as plastic or polymer sheets may now be used for liquid crystal devices which do not need to withstand the high temperatures normally used in the hard-bake and soft-bake alignment layer formation processes.

A polarizer 14 may be disposed on the outer surface of each substrate 12 for the purpose of modifying the optical characteristics of transmitted light to provide a cell for operation in the transmissive mode. An electrode 18 may be provided on the inside surfaces of each of the substrates 12. In the preferred embodiment, each electrode 18 is an indium-tin oxide material. Alternatively, to provide a device for operation in the reflective mode, a mirror or a light diffuser may be added to the outside of a substrate opposite to the light source.

A power source 20 is attached to the electrodes 18 through a switch 22. The switch 22 can be used to connect the power source, short the two electrodes, or disconnect the electrodes to store charge on them. Application of an electric or electromagnetic field or other external force causes optical switching of liquid crystal or organic material that is disposed between the substrates. Operation of the switch 22 may be controlled by an appropriately designed electronic drive. Use of an electronic driver circuit allows particular areas of a matrix cell device to be addressed, which in turn allows creation of high contrast between the areas. As shown in FIG. 1, a cell gap thickness between the electrodes is defined by a dimension 26.

A composite organic material 28, comprising at least the following components—an organic or liquid crystal material, a prepolymer, and an aligning agent such as a low-temperature-curable polyimide—is captured between the substrates 12. To obtain the material 28, the liquid crystal material is combined in a solution with the prepolymer and the polyimide, and filled between the substrates 12 by capillary action. Of course, other known methods of filling may be employed. The edges of the substrates 12 are sealed, utilizing known methods. Alternatively, the material 28 may be spin-coated on a single substrate.

Figure 2:
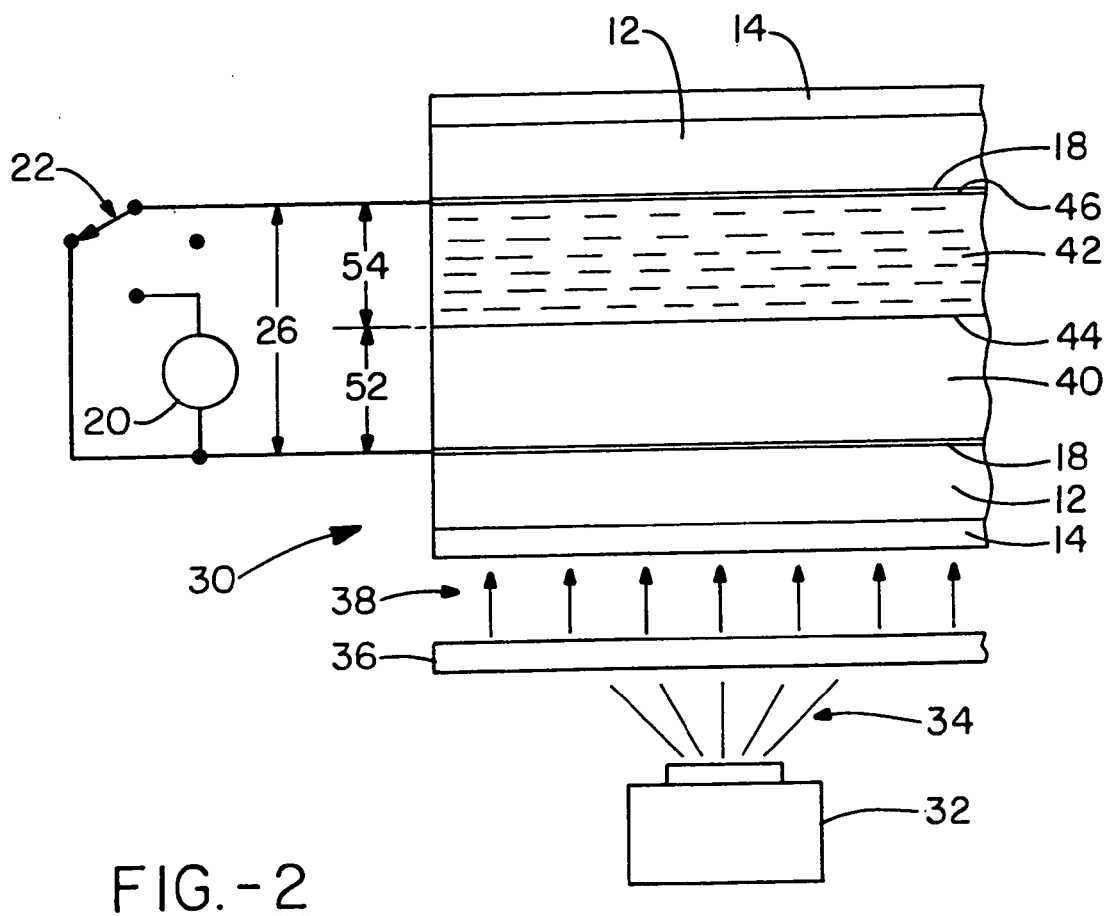
FIG. 2 is an enlarged, partial cross-sectional, schematic view of a light modulating device, after simultaneous one-step alignment and polymerization according to the present invention.

Referring now to FIG. 2, it can be seen that a light modulating cell, fabricated by a one-step simultaneous phase separation and alignment method according to the present invention, is designated generally by the numeral 30.

Generally, the "one-step method" is a method in which a layer of material—which includes at least the organic or liquid crystal material, a prepolymer, and a polarization-sensitive aligning agent such as a chromophore—is disposed onto a substrate by, for example, spin-coating, wherein the coated substrate is exposed to a treatment selected from the group consisting of polarized visible light radiation, or polarized UV light radiation, and some type of phase separation. The one-step method is thus characterized in that all components are subjected to the same treatment simultaneously to homogeneously align the phase separated liquid crystal material component.

A light source 32, such as an ultraviolet or visible light, is proximally positioned below a linear polarizer 36. When energized, the light source 32 generates rays 34 which impinge upon the linear polarizer 36 which directs linearly polarized rays 38 through the substrate 12 and into the cell gap 26. The light, or some other process to be described, induces polymerization of the prepolymer material which was primarily mixed with the aligning agent. As polymerization proceeds, phase separation between the liquid crystal material and the polymer/aligning agent occurs. This is known as polymerization induced phase separation. In particular, a light transmissive solidified polymer layer 40 is formed on the electrode 18 of the substrate 12 adjacent the light source 32. A liquid crystal film layer 42 is formed on the opposed substrate 12, adjacent to the other electrode 18. Simultaneous with the phase separation, the linearly polarized rays 38 break photosensitive bonds in the prepolymer/polyimide layer and align polymer segments along a direction perpendicular to the direction of the polarization of the linearly polarized rays. Additionally, depending on the chemical nature of the materials, the rays 38 may orient the polymer segments parallel or perpendicular to the substrate or cross-link the polymer material in a specific direction parallel to the substrate. This facilitates alignment of the liquid crystal film layer 42 at an interface 44 between the polymer layer 40 and the liquid crystal layer 42. At the interface 44, the liquid crystal appears to imprint compatible anchoring conditions of alignment during the phase separation. It is also believed that a minimal amount of polyimide material may adhere to the opposed substrate and mimic the alignment orientation at the interface 44. If desired, a separate and distinct alignment layer may be provided on the substrate opposite the interface 44.

As seen in FIG. 2, the thickness of the polymer layer is defined by a dimension 52, and the thickness of the liquid crystal layer is shown by a dimension 54. The physical parameters of the liquid crystal film, such as its thickness, alignment conditions, and the liquid crystal material can be selected for desired objectives by adjusting composition and by the use of appropriately sized spaces to fix the cell gap. Homogeneously aligned cells using nematic liquid crystals have been prepared with the method of the present invention. Additionally, ferroelectric and antiferroelectric liquid crystal in such structures are found to have grey scale and even bistability. These cells possess much lower threshold voltages, scatter almost no light (no haziness), and are mechanically and electrically rugged. Some liquid crystal materials exhibit modified electro-optic (EO) behavior in phase separated composite organic films. Optically controllable birefringent devices can also be formed using this method. This method permits fabrication of uniform, very thin liquid crystal films. Several uniform films with thickness comparable to the wavelength of red light have been prepared with the method of the present invention.

It will be appreciated by those skilled in the art that in the practice of the present invention, phase separation can be achieved by utilizing thermal, chemical, or solvent induction techniques. Any of these techniques can be employed in conjunction with irradiation to achieve simultaneous phase separation and photoalignment. While not wanting to be bound by theory, it is believed that the polarized rays are critical in aligning the liquid crystal material in a uniform manner at the interfaces 44 and 46.

Suitable prepolymers for the practice of the present invention are photopolymerizable monomers which are sensitive to the direction of polarization of the UV light so that exposure to UV light simultaneously and directionally polymerizes the monomer and macroscopically aligns the polymer. Prepolymers which are not normally sensitive to the polarization of UV light can be useful if modified by the addition of, for example, a chromophore component. Thus, suitable prepolymers include, but are not limited to, NOA-65 (available from Norland Products, Inc.), vinyl ether, acrylates, epoxies, diacetylanes, vinyls, and the like. For chromophores, materials such as azobenzene, stilbenzene, cinnamate, chalcone, coumarin, dimaleimide, and the like can be used. Useful polyimides are homo- or co-polyimides with side chains that have low light absorption, and include SE-1180,610 (available from Nissan Chemical Ind.), and functional groups with chromophores incorporated therein.

The liquid crystal material can be selected dependent upon the type of light modulating device desired. Suitable liquid crystal materials include, but are not limited to, nematic, ferroelectric, antiferroelectric, cholesteric and related liquid crystal materials.

Figure 3:
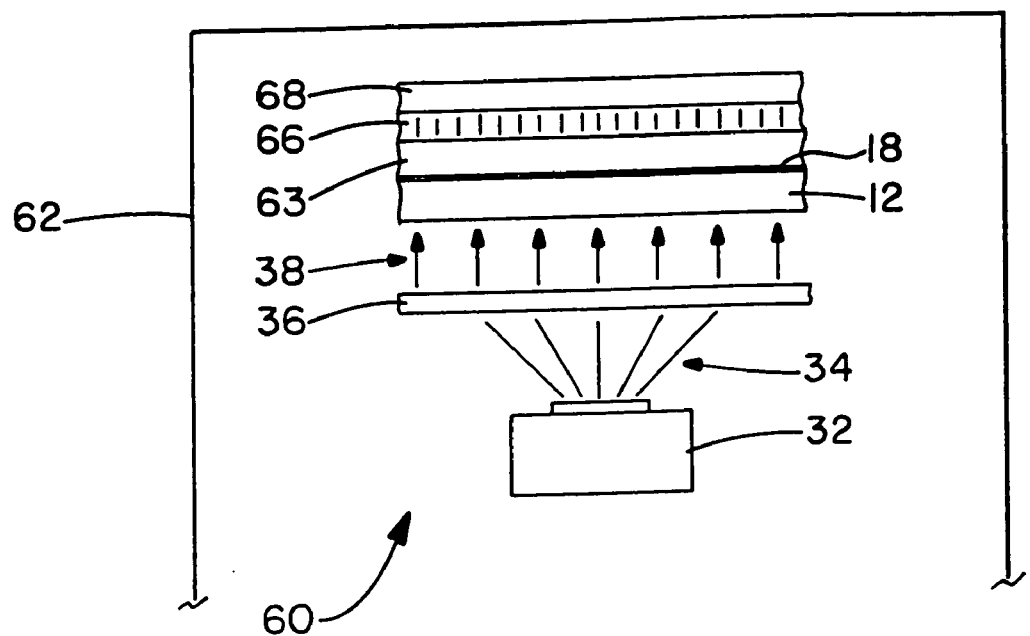
FIG. 3 is an enlarged, partial cross-sectional, schematic view of a device after implementation of the multi-step method according to the present invention.

As stated above, by using the method of the present invention it is possible to prepare parallel films of polymer and aligned liquid crystal either inside a cell or on a substrate. Referring now to FIG. 3, it can be seen that a device used to implement either the one-step or multi-step method of the present invention is designated generally by the numeral 60. The device may be enclosed within a heat source 62 when thermally induced polymerization is employed. If appropriate, heat from the light source 32 may also be used.

In one embodiment of the one-step method as defined above, a mixture of a reactive liquid crystal monomer, a photomonomer and a low-temperature-cure polyimide is formulated for preparing anisotropic films. The reactive liquid crystal monomer can be selected from nematic diacrylate monomers and a chiral diacrylate dopant having the acrylate polymerizable group. A photomonomer such as NOA-65, and a low temperature curing polyimide such as SE-1180 is mixed with a reactive liquid crystal monomer to form a photosensitive material. This mixture is spin-coated onto the substrate. As shown in FIG. 2, a UV light source 32 emits rays 34 which pass through a linear polarizer 36. The linearly polarized rays 38 pass through the substrate 12 and electrode 18, and irradiate the coating mixture. Simultaneous polarized UV light induced phase separation and alignment of reactive liquid crystal monomers at the interface 44 is achieved. The one-step method of the present invention produces alignment of the liquid crystal without a separate alignment layer at the interface 46, and thereby eliminates the need for additional spin-coating and rubbing steps.

Similarly, the reactive liquid crystal monomer can be selected from nematic diepoxy monomers and a chiral diepoxy dopant having the epoxy polymerizable group. A photomonomer, a photoinitiator, and a low-temperature-cure polyimide is mixed with the reactive epoxy-based monomer. This mixture is spin-coated onto a substrate and irradiated as described above. Polarized UV light irradiation results in simultaneous phase separation and photoalignment.

The one-step methods discussed above are believed to be the most effective and efficient for forming a homogeneously aligned liquid crystal device without a separate and distinct alignment layer. The other methods mentioned above, such as those that utilize light radiation, heat and/or solvent evaporation, may be implemented based on the above teachings to achieve substantially the same result.

In another example of the one-step method, a photo-crosslinkable polyimide comprising functional side groups such as cinnamate or coumarin is prepared and spin-coated onto a substrate. A reactive liquid crystal monomer such as liquid crystal diacrylates, divinyl ether, di-epoxied, liquid crystal diacetylene, or other monomers with a functionality of 2 or greater and a photoinitiator is then spin-coated on top of the polyimide film. Subsequent polarized UV irradiation results in simultaneous photoalignment and photopolymerization. Spin-coating the reactive liquid crystal monomer onto the polyimide layer before the polyimide has been cured may make the surface slightly non-uniform, but will not interfere with alignment of the liquid crystal material.

Figure 4:
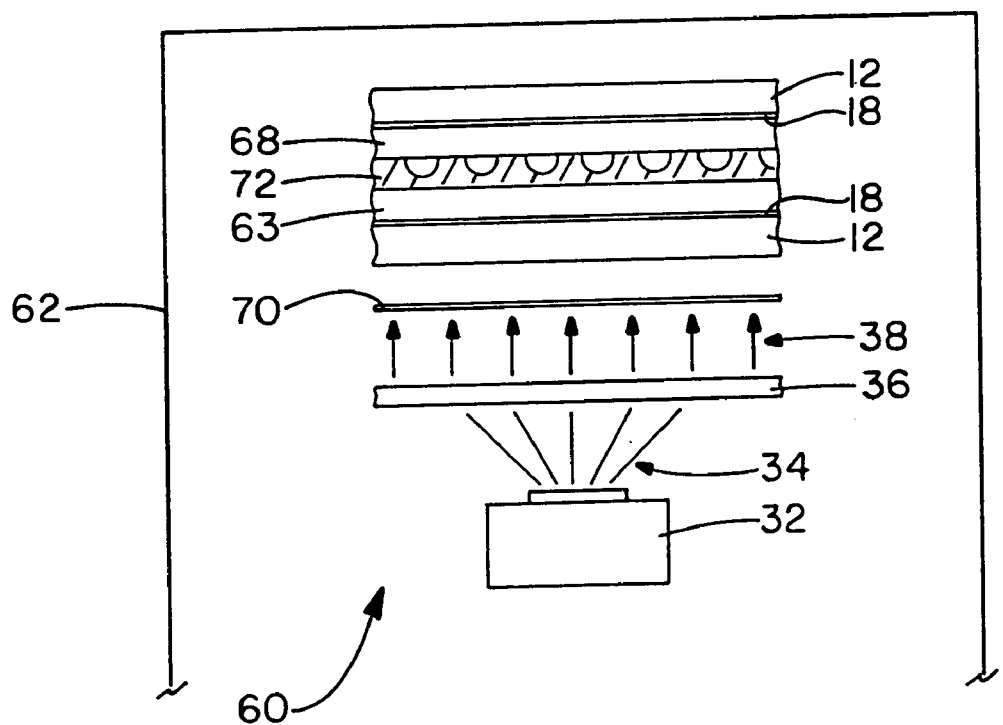
FIG. 4 is an enlarged, partial cross-sectional, schematic view of a microstructure device after implementation of the multi-step method according to the present invention.

In instances where multiple alignments of liquid crystal material are required, multiple steps may be used. The "multi-step method" refers to a method in which a substrate is coated and treated as in the one-step method to produce an alignment layer and/or a layer/microstructure of liquid crystal material, and then further layers are spin-coated onto the previously applied layers and further treated by one or more of the treatments described above, such as visible or UV radiation, radiation in combination with heat treatment, or radiation in combination with solvent evaporation. The multi-step method comprises a sequence of at least two material disposing steps, wherein during each step at least one type of material is applied. More specifically, by utilizing the multi-step method of the present invention, different layers or microstructures of uniquely aligned liquid crystal material interfaces can be obtained. Moreover, as seen in FIG. 4, masks 70 with appropriate openings may be positioned between the polarizer and the substrate and re-positioned at various stages to assist in the formation of aligned and electrically controllable microstructures 72.

Generally, an example of a configuration which could be achieved by using the multi-step method of the present invention is shown in FIG. 3. It can be seen that an electrode layer 18 may be disposed adjacent to a substrate 12, and various layers of alignment inducing polymer with liquid crystal material, as described in the one-step method, are disposed thereupon.

The multi-step method may be employed where it is desired to provide different liquid crystal director orientations at the interface of the liquid crystal material which is adjacent to layers or microstructures of dissimilar material which may be a polyimide-doped polymer layer or form, a substrate, or an equivalent film. Or, the multi-step method may be employed to form anisotropic films in which a material that will form the alignment layer is first disposed on the substrate and wherein another material which includes liquid crystal material, prepolymer and an aligning agent is disposed thereon. The materials are then phase-separated and photo-aligned to form an anisotropic film. At a minimum, the end result of the multi-step method provides at least an alignment interface layer 63 adjacent to the substrate 12 and a liquid crystal layer 66 adjacent to the interface layer 63. Additionally, a second alignment interface layer 68 adjacent the liquid crystal layer 66 may also be formed. The multi-step method allows for the second alignment interface layer to impart a different orientation to the liquid crystal layer 66 than the orientation of the first alignment interface layer 63. It is envisioned that the multi-step method would be extremely useful in the construction of twisted nematic devices, super twisted nematic devices, optically or electrically controllable birefringent devices or any device that requires orientational changes to the liquid crystal material. The materials that make up the layers 63, 66, and 68 may be disposed and formed in various combinations, depending upon the end result desired. It will also be appreciated that the multi-step method may be employed to form anisotropic films that, otherwise, could not be formed. This method is also advantageous in that films can be formed without spin-coating materials twice. Generally, the precursor device is exposed to a treatment selected from a group consisting of applications of different polarized UV light wavelengths, applications of different polarized visible light wavelengths, applications of polarized UV and polarized visible light, simultaneous visible light radiation and heat, simultaneous UV light radiation and solvent evaporation, and UV light radiation. Various examples of the multi-step methods and their resulting devices will now be discussed.

In one example of a multi-step method, an azobenzene liquid crystal polymer (LCP) is spin-coated onto a substrate. A reactive monomer, such as liquid crystal diacrylates, divinyl ether, di-epoxied, liquid crystal diacetylene, or other monomers with a functionality of 2 or greater and a suitable photo-initiator, is coated on top of the azobenezene LCP film. Subsequent application of polarized UV irradiation results in simultaneous photoalignment and photopolymerization and formation of layers 63 and 66. The second spin-coating may make the surface of the first film slightly non-uniform, but will not cause problems with alignment.

In another example of the multi-step method, a photo-monomer such as NOA65 and polyimide that contains chromophore material are mixed and coated onto the substrate. The coated substrate is irradiated with linearly polarized UV light, resulting in periodic undulation of the polymer surface to form the layer 63. A reactive liquid crystal monomer is spin-coated onto the polymer surface and polymerized by irradiation with UV light. The result is an anisotropic film.

In another example of the multi-step method, a first mixture comprising a vinyl ether, a photo-initiator, and polyimides with chromophore components are spin-coated onto a substrate and irradiated by linearly polarized UV light having a wavelength, for example, of less than or equal to about 320 nanometers. A second mixture comprising acrylates, a photo-initiator, and polyimides with chromophores is spin-coated onto the first layer and irradiated by linearly polarized UV light having a wavelength, for example, of greater than or equal to about 350 nanometers. It will be appreciated that the desired liquid crystal material may be incorporated into the first or the second mixture. Moreover, the orientation of the linear polarizer 36 is changed as needed after the first exposure of the first material so as to obtain the desired second orientation. Also, the wavelengths of light selected are dependent upon the chromophore/ photoaligning materials selected. Depending upon which mixture contains the liquid crystal material, the position of the light source 32 may be adjusted accordingly. The result is a multi-layered anisotropic film, wherein each layer is individually and uniquely oriented that is useful for optical compensation and display devices which require change in orientation at different substrate surfaces. It will be appreciated by those of skill in the art that the mixtures can be applied and treated in the reverse order. In other words, the layers may be applied consecutively and exposed to the application of UV light. Or, one layer may be disposed, exposed to UV light, and then the second layer disposed and the exposed to UV light.

Similarly, by selecting appropriate combinations of ingredients, the multi-step method of the present invention can be utilized to fabricate coated substrates wherein one layer comprises a vinyl ether, a photo-initiator, and a polyimide with chromophores and is treated with UV radiation as discussed above, and a second layer comprises an acrylate and a polyimide with a chromophore and is treated with visible radiation. In order to polymerize and align a material so that it is sensitive to visible light, a sufficient amount of at least about 1% maleimide is included in the mixture. As a result, the mixture is exposed to visible light that has a wavelength, for example, greater than or equal to 410 nanometers. As above, the liquid crystal material may be in either the first or second mixture. Of course, the polarization direction may be changed to vary the orientation of the liquid crystal material as needed. Such a multi-step method has use for the fabrication of retardation films, as well as other electro-optical components.

In a further embodiment of the multi-step method of the present invention, a first layer comprising epoxy monomers and curing agents are coated onto a substrate and heat treated to induce polymerization. A second layer comprising UV curable monomers, a photo-initiator, and polyimides for photoalignment are coated onto the first layer and irradiated with linearly polarized UV radiation. The layers may be applied in reverse order if desired. If this is the case, the polyimides with chromophore will be included in the thermally formed layer. As above, the liquid crystal material maybe included in either mixture of the first or second layers. Such devices provide different liquid crystal orientations for optical retardation, optical compensation and adjustable retardation.

In yet a further embodiment, a first layer comprising reactive liquid crystal monomers, a photoinitiator, and polyimides are coated onto the substrate and irradiated with linearly polarized visible radiation as taught above. A second layer comprising epoxy resin and curing agents is applied onto the first layer and heated to cause solvent-induced phase separation of the second layer as taught above. The application of the layers may also be reversed if desired.

Similarly, thermally-induced phase separation can be utilized in the multi-step method of the present invention. A layer comprising PMMA, and reactive liquid crystal monomers can be deposited either before or after a UV- or visible-irradiated layer is processed. If UV light is employed, a pre-polymer such as PMMA or polyimides are used along with reactive monomers, UV photoinitiator, and the liquid crystal material. If visible light is used, the UV photoinitiator is replaced with a visible light photoinitiator.

It will be appreciated by those skilled in the art that the advantages of the present invention are numerous. First, the light modulating device of the present invention is useful in optically and electrically controllable devices. The disclosed method for fabricating an aligned liquid crystal device without a separately formed alignment layer, in a single UV exposure step, is simpler and more cost effective, and can replace known methods for fabricating any liquid crystal device which currently employs an alignment layer. Elimination of the rubbing procedure results in less damage to the device and improves manufacturing yields. Elimination of the high temperature baking steps used in the prior art allows the use of plastic substrates.

The method of the present invention is very versatile, and may be employed with nematic, ferroelectric, anti-ferroelectric, and cholesteric liquid crystal materials to name a few. The methods of the present invention can be utilized to fabricate multi-layer anisotropic films wherein each layer has an individual and unique orientation. By adjusting the incident angle of irradiation, it is possible to obtain molecular pre-tilt in the liquid crystal layers. Patterned microstructures utilizing masks during application of the ultraviolet or visible can be used to manufacture active devices or anything that can be switched, optically, electrically, or that is sensitive to a mechanical stimulus. Moreover, the methods taught by this disclosure are applicable to any liquid crystal device that requires alignment.

Thus, it can be seen that the objects of the invention have been satisfied by the structure and its method for use presented above. While in accordance with the Patent Statutes, only the best mode and preferred embodiment have been presented and described in detail, it is to be understood that the invention is not limited thereto or thereby. Accordingly, for an appreciation of true scope and breadth of the invention, reference should be made to the following claims.

What is claimed is:

1. A method for fabricating simultaneously a phase separated organic film with alignment, comprising:
   preparing a mixture of liquid crystal, prepolymer and polarization-sensitive material;
   disposing said mixture on a substrate;
   applying a polarized light from a light source to said mixture disposed on the substrate; and
   inducing phase separation of said mixture simultaneously during said applying step to form a separate layer of homogenously aligned liquid crystal material adjacent a separate and distinct layer of polymer and said polarization-sensitive material on said substrate, wherein the inducing includes polymerizing the pre-polymer to generate the polymer layer, and the alignment of the phase separated liquid crystal layer is induced by alignment of the polymer and polarization-sensitive material layer caused by the simultaneously applying of the polarized light.

2. The method according to claim 1, further comprising: disposing a second substrate over said layers.

3. The method according to claim 2, further comprising: positioning a mask and a polarizer between said light source and said substrate prior to said applying step so as to form said layer of liquid crystal with microstructures, wherein all of said microstructures are adjacent to said second substrate.

4. The method according to claim 1, wherein the applying of a polarized light comprises:
   illuminating with a light source a side of the substrate opposite the side of the substrate having said mixture disposed thereon, said illuminating transmitting through the substrate to the mixture; and
   interposing a polarizer between said light source and said substrate to impart a desired polarization to the light that in turn causes the alignment of the polymer and polarization-sensitive material layer.

5. The method according to claim 4, wherein the light source is selected from a group consisting of: (i) an ultraviolet light source and (ii) a visible light source.

6. The method according to claim 1, further comprising:
   preparing an initial mixture of an initial prepolymer and an initial polarization-sensitive material; and
   coating said initial mixture on said substrate prior to said mixture disposing step.

7. The method according to claim 6, wherein said initial polarization-sensitive material is sensitive to a different wavelength of light than said polarization-sensitive material.

8. The method according to claim 7, further comprising:
   applying an initial polarized light to said initial mixture coated on said substrate prior to said mixture disposing step to impart an alignment orientation thereto.

9. The method according to claim 6, wherein said initial prepolymer includes epoxy and resin.

10. The method according to claim 9, wherein said polarized light is either visible or ultraviolet.

11. The method according to claim 7, further comprising:
    applying an initial polarized light to said initial mixture coated on said substrate after said mixture disposing step to impart an alignment orientation thereto.

12. The method according to claim 11, wherein the applying of the initial polarized light comprises:
    illuminating with a light source a side of the substrate opposite the side of the substrate having said initial mixture coated thereon, said illuminating transmitting through the substrate to the initial mixture; and
    positioning a mask and a polarizer between said light source and said substrate during the illuminating so as to form said layer of liquid crystal with microstructures, wherein all of said microstructures are adjacent to a second substrate disposed over said layers.

13. The method according to claim 12, further comprising:
    positioning another mask between said light source and said substrate after said initial applying step.

14. The method according to claim 1, wherein the inducing of phase separation includes:
    thermally inducing phase separation of said mixture.

15. The method according to claim 14, wherein said polarized light is either visible or ultraviolet.

16. The method according to claim 1, wherein said applying of polarized light simultaneously induces said phase separation.

17. A method for fabricating a liquid crystal device with alignment properties comprising:
   providing a first mixture comprising at least a first polarization-sensitive agent and a prepolymer;
   providing a second mixture comprising at least a second polarization-sensitive agent and a prepolymer;
   mixing into either said first or second mixture a liquid crystal material;
   disposing said first mixture on to a substrate;
   disposing said second mixture over said first mixture;
   applying a first polymerization process to said first mixture, the first polymerization process being selected from the group consisting of (i) applying polarized visible light, (ii) applying polarized ultraviolet light, (iii) applying thermal induction, (iv) applying chemical induction, and (v) applying solvent induction;
   applying a second polymerization process to said second mixture, the second polymerization process being selected from the group consisting of (i) applying polarized visible light, (ii) applying polarized ultraviolet light, (iii) applying thermal induction, (iv) applying chemical induction, and (v) applying solvent induction; and
   said polymerization processes causing the liquid crystal material to phase separate into a separate and distinct phase-separated liquid crystal layer, at least one of said first and second polymerization processes applying polarized visible or ultraviolet light that imparts orientational alignments to said liquid crystal layer.

18. The method according to claim 17, further comprising:
   securing a second substrate to said first substrate with said first and second mixtures therebetween.

19. The method according to claim 17, wherein said applying of polarized light processes comprise:
   positioning a light source near said substrate; and
   positioning a polarizer between said substrate and said light source.

20. The method according to claim 19, further comprising:
   re-positioning said polarizer after said first initiating step, wherein said polarization-sensitive agents impart different orientational alignments at their respective interfaces with said liquid crystal.

* * * * *